US006795445B1

(12) United States Patent
Kabie et al.

(10) Patent No.: US 6,795,445 B1
(45) Date of Patent: Sep. 21, 2004

(54) HIERARCHICAL BANDWIDTH MANAGEMENT IN MULTISERVICE NETWORKS

(75) Inventors: Sameh A. Kabie, Kanata (CA); Ramy M. Guirguis, Nepean (CA)

(73) Assignee: Nortel Networks Limited, Quebec (CA)

( * ) Notice: Subject to any disclaimer, the term of this patent is extended or adjusted under 35 U.S.C. 154(b) by 810 days.

(21) Appl. No.: 09/697,120

(22) Filed: Oct. 27, 2000

(51) Int. Cl.[7] .............................................. H04L 12/56
(52) U.S. Cl. ...................................... 370/401; 370/469
(58) Field of Search ................................ 370/355, 356, 370/400, 401, 469

(56) References Cited

U.S. PATENT DOCUMENTS

| | | | | |
|---|---|---|---|---|
| 5,953,338 A | * | 9/1999 | Ma et al. ..................... | 370/400 |
| 6,092,113 A | * | 7/2000 | Maeshima et al. .......... | 370/355 |
| 6,522,627 B1 | * | 2/2003 | Mauger ....................... | 370/356 |

FOREIGN PATENT DOCUMENTS

| | | |
|---|---|---|
| EP | 0 952 741 A2 | 10/1999 |
| EP | 0 957 648 A2 | 11/1999 |
| EP | 1 069 742 | 7/2000 |
| WO | WO 00/33606 | 6/2000 |
| WO | WO 00/36871 | 6/2000 |

OTHER PUBLICATIONS

Duffield, Nick et al., "*A Performance Oriented Service Interface for Virtual Private Networks*", Internet Draft (IETF) Nov. 1998, pp. i–xxviii, XP–002227148.

Awduche, Daniel O. et al., "*Extensions to RSVP for LSP Tunnels*" MPLS Working Group (IETK), Sep. 1999, pp. 1–45, XP–002232179.

* cited by examiner

*Primary Examiner*—Salvatore Cangialosi

(57) ABSTRACT

A hierarchical bandwidth management model for multiservice networks that provide management at a transport level and at a service/application level to provide increased network scalability without sacrificing bandwidth management efficiency and flexibility. In particular, in an Multiprotocol Label Switching (MPLS) environment, a method of hierarchical bandwidth management in a multiservice network supporting various quality of service levels (e.g. EF, AF1, AF2, BE) and a number of applications (e.g. ATM, MPLS, IP, FR) is disclosed. The method includes the steps of: establishing a transport connection tunnel (e.g. an E-Label Switched Path(LSP)) between pairs of the edge nodes in the network; and managing bandwidth of the transport connection tunnel among the quality of service levels and the applications. In an exemplary embodiment the invention also provides a hierarchical admission structure: one at a transport level for the label switched paths and one at a service level for user/application connections. The hierarchical bandwidth management model (exemplified in a method and an apparatus) provides the ability to share and/or partition bandwidth by application and quality of service and the ability of customer-controlled trade-off of bandwidth guarantee (per application/QoS) and network efficiency (i.e. low fragmentation).

40 Claims, 10 Drawing Sheets

TRANSPORT POOLS
106
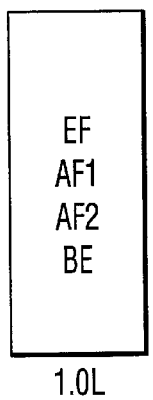
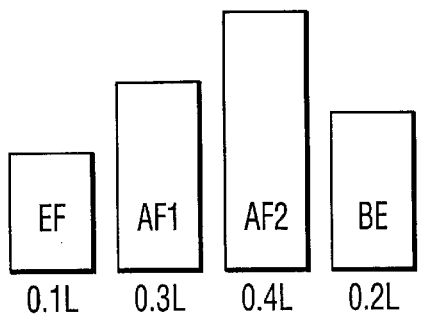
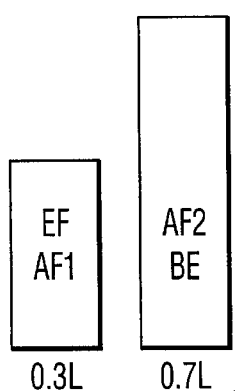
FIG. 3
APPLICATION POOLS
(116)
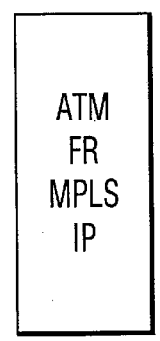
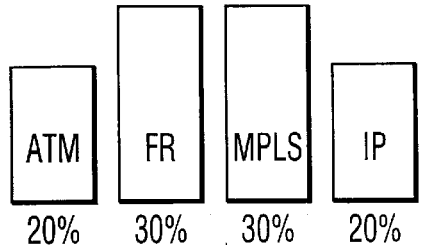
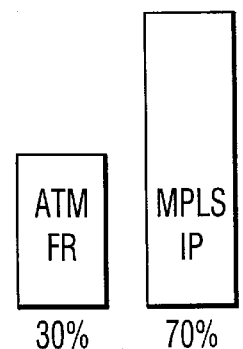
FIG. 4

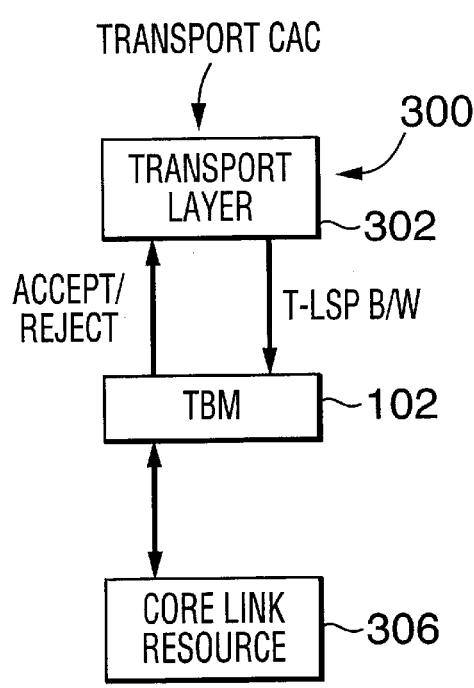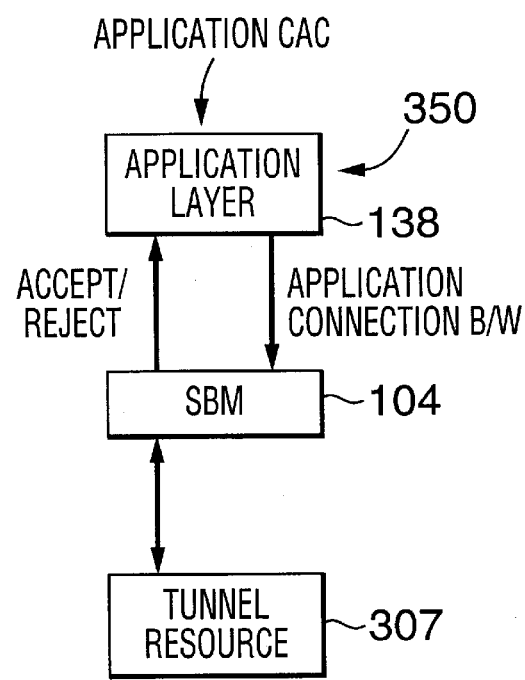
FIG. 8A                    FIG. 8B

HIERARCHICAL BANDWIDTH MANAGEMENT IN MULTISERVICE NETWORKS

FIELD OF THE INVENTION

The present invention relates generally to multiservice networks, and more particularly to a method and system to provide bandwidth management within multiservice networks.

BACKGROUND OF THE INVENTION

FIG. 1A illustrates key components of a multiservice network 10 having a core network 12 that includes a plurality of core nodes 14 (i.e. service provider backbone or provider core nodes) interconnected with core links 16. An access network 18 that includes a plurality of edge nodes 20 (i.e. service provider edge or provider edge nodes) provide access to the core network 12 through the links 16 for a plurality of access nodes 23 and/or for a plurality of customer premise edge (CPE) nodes 24.

The CPE nodes 24 originate user connections, such as ATM, FR, voice or MPLS service requests. The access nodes 23 optionally lie between the CPEs 24 and the edge nodes 20. The access nodes 23 do not perform aggregation (i.e. individual user connections are all visible). The access nodes 23 run the service protocols (e.g. ATM P-NNI, FR routing) and generally use single-level bandwidth management.

The edge nodes 20 (also called edge switch/routers) perform the interworking function/adaptation between the access 18 and the core 12. The edge nodes 20 fully participate in the access network 18 similar to the access nodes 23 discussed above and fully participate in the core transport 12. The edge nodes 20 also perform the aggregation of access/user connections into transport tunnels across the core 12.

The core nodes 14 (also called core routers or MPLS core routers) have no visibility of individual user connections or applications (i.e. pure IP/MPLS routers). The core nodes 14 are connected to the edge nodes 20 and among themselves with the core links 16 and perform single-level bandwidth management (namely, Transport Bandwidth Management), which manages the bandwidth of the underlying physical links between the various transport tunnels. The core and edge nodes 14, 20 participate in the core routing and maintain the same core topology database.

Prior art models use a flat network architecture, which makes no distinction between the access 18 and core 12 networks. Each CPE node 24 connection is mapped to a corresponding Multiprotocol Label Switching (MPLS) Label Switched Path (LSP) connection at the access/edge 23, 20 node. Compared to traditional pure IP connectionless networks, the use of MPLS has been proposed to provide the capabilities of traffic engineering with constraint-based routing, alternate paths for redundancy, and load distribution. Another motivation for using MPLS is to provide connections with different characteristics to support a range of services and quality of service (QoS) levels.

Although these solutions improve scalability somewhat, a large number of LSP connections in the network 10 are required. This is not scalable because the core nodes 14 are required to maintain context and signaling support for a very large number of individual user connections/flows (i.e. between the CPEs 24) sharing the network 10. The increased number of LSP network connections introduces further disadvantages such as operations complexity, slow failure recovery, and increased network control overhead Consequently, there is a need for a method and system for managing bandwidth in multiservice network, (supporting for example ATM, FR, IP, MPLS, circuit emulation) that minimizes operations complexity, speeds up failure recovery, and minimized network control overhead.

SUMMARY OF THE INVENTION

The present invention provides a hierarchical bandwidth management model for multiservice networks that creates one or more aggregate tunnels for carrying user traffic between edge nodes in a multiservice network. In an exemplary embodiment the invention also provides a hierarchical admission structure: one at a transport level for the label switched paths and one at a service level for user/application connections.

In accordance with one aspect of the present invention there is provided a method of hierarchical bandwidth management in a multiservice network supporting a plurality of quality of service levels and a plurality of applications, the multiservice network includes a core, a plurality of access nodes and a plurality of edge nodes having connectivity with each other through the core, the method comprising the steps of: (a) establishing a plurality of transport connection tunnels between pairs of the edge nodes in the network; and (b) managing bandwidth of the transport connection tunnels among the plurality of quality of service levels and the plurality of applications.

In an exemplary embodiment step (a) above includes the steps of: (a1) establishing at least one transport pool; (a2) assigning the plurality of quality of service levels to the least one transport pool; and (a3) assigning at least one transport pool to the plurality of transport connections.

In an exemplary embodiment step (b) above includes the steps of, (b1) establishing at least one application pool; and (b2) assigning the plurality of applications to the least one application pool.

In accordance with another aspect of the present invention there is provided a method of hierarchical bandwidth management in a multiservice network supporting a plurality of quality of service levels and a plurality of applications, said multiservice network having a core, a plurality of access nodes and a plurality of edge nodes having connectivity with each other through the core, said method comprising the steps of: (a) establishing a transport connection tunnel between pairs of the edge nodes in the network; and (b) managing bandwidth of the transport connection tunnel among die plurality of quality of service levels and the plurality of applications.

In accordance with another aspect of the present invention there is provided an apparatus for hierarchical bandwidth management in a multiservice network supporting a plurality of quality of service levels and a plurality of applications, said multiservice network having a core, a plurality of access nodes and a plurality of edge nodes having connectivity with each other through the core, said apparatus comprising: (a) a transport bandwidth management (TBM) module for establishing a transport connection tunnel between pairs of the edge nodes in the network; and (b) a service bandwidth management (SBM) module communicatively coupled to the TBM module for managing bandwidth of the transport connection tunnel among the plurality of quality of service levels and the plurality of applications.

In an exemplary embodiment, the TBM module includes: a module for establishing and managing a transport pool; a module for assigning the plurality of quality of service levels to the transport pool; and a module for assigning the transport connection tunnel to the transport pool.

In an exemplary embodiment, the SBM module includes: a module for establishing and managing a plurality of application pools; a module for assigning the plurality of applications at the plurality of quality of service levels to each of the plurality of application pools; and a module for assigning the application connection to the plurality of application pools.

In accordance with another aspect of the present invention there is provided a computer program product for hierarchical bandwidth management in a multiservice network supporting a plurality of service categories and a plurality of applications, said multiservice network having a core, a plurality of access nodes and a plurality of edge nodes having connectivity with each other through the core, said computer program product comprising: (a) a computer readable medium; (b) a transport bandwidth management (TBM) module for establishing a transport connection tunnel between pairs of the edge nodes in the network; and (c) a service bandwidth management (SBM) module communicatively coupled to the TBM module for managing bandwidth of the transport connection tunnel among the plurality of quality of service levels and the plurality of applications.

In accordance with another aspect of the present invention there is provided a method of hierarchical bandwidth management in a multiservice network supporting a plurality of quality of service levels and a plurality of applications, said multiservice network having a core, a plurality of access nodes and a plurality of edge nodes for establishing user connections, said edge nodes having connectivity with each other through the core, said method comprising the steps of: (a) establishing a plurality of transport connection tunnels between pairs of the edge nodes in the network at a transport layer; (b) managing bandwidth of the transport connection tunnels at an application layer; (c) controlling admission of the plurality of transport connection tunnels at the transport layer; and (d) controlling admission of the user connections belonging to the plurality of applications at the plurality of quality of service levels.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Further features and advantages of the present invention will be described in the detailed description, taken in combination with the appended drawings, in which:

FIG. 3 illustrates a schematic representation of various transport pool partitioning arrangements as part of the transport bandwidth management module shown in FIG. 1;

FIG. 4 illustrates a schematic representation of various application pool partitioning arrangements as part of the service bandwidth management module shown in FIG. 1;

FIGS. 8A and 8B illustrate functional diagrams of the distributed connection admission control of hierarchical bandwidth management of the present invention.

DETAILED DESCRIPTION OF EMBODIMENTS OF THE PRESENT INVENTION

To provide a proper basis of terminology the following standards are used:

(a) application and service are used synonymously to refer to, for example: Asynchronous Transfer Mode (ATM); Frame Relay (FR): Multiprotocol Label Switching (MPLS); and Internet Protocol (IP);

(b) tunnel refers to the aggregate/transport LSPs across the core 12 (i.e. they originate and terminate on the edge nodes 20) The core nodes 14 view them as regular LSP connections;

(c) IP-DiffServ (Differentiated Services) Quality of Service (QoS) terminology is used when discussing transport bandwidth management (e.g. Expedited Forwarding (EF); Assured Forwarding levels 1 and 2 (AF1 AF2); and Best Effort (BE).); and (d) ATM Quality of Service (QoS) terminology (e.g. Constant Bit Rate (CBR); Real-Time Variable Bit Rate (VBR-rt); Non-Real-Time Variable Bit Rate (VBR-nrt); and Unspecified Bit Rate (UBR).) when discussing service bandwidth management. Items (c) and (d) are merely examples as some services such as IP or MPLS may use IP terms and FR may use other terminology.

Figure 1A:
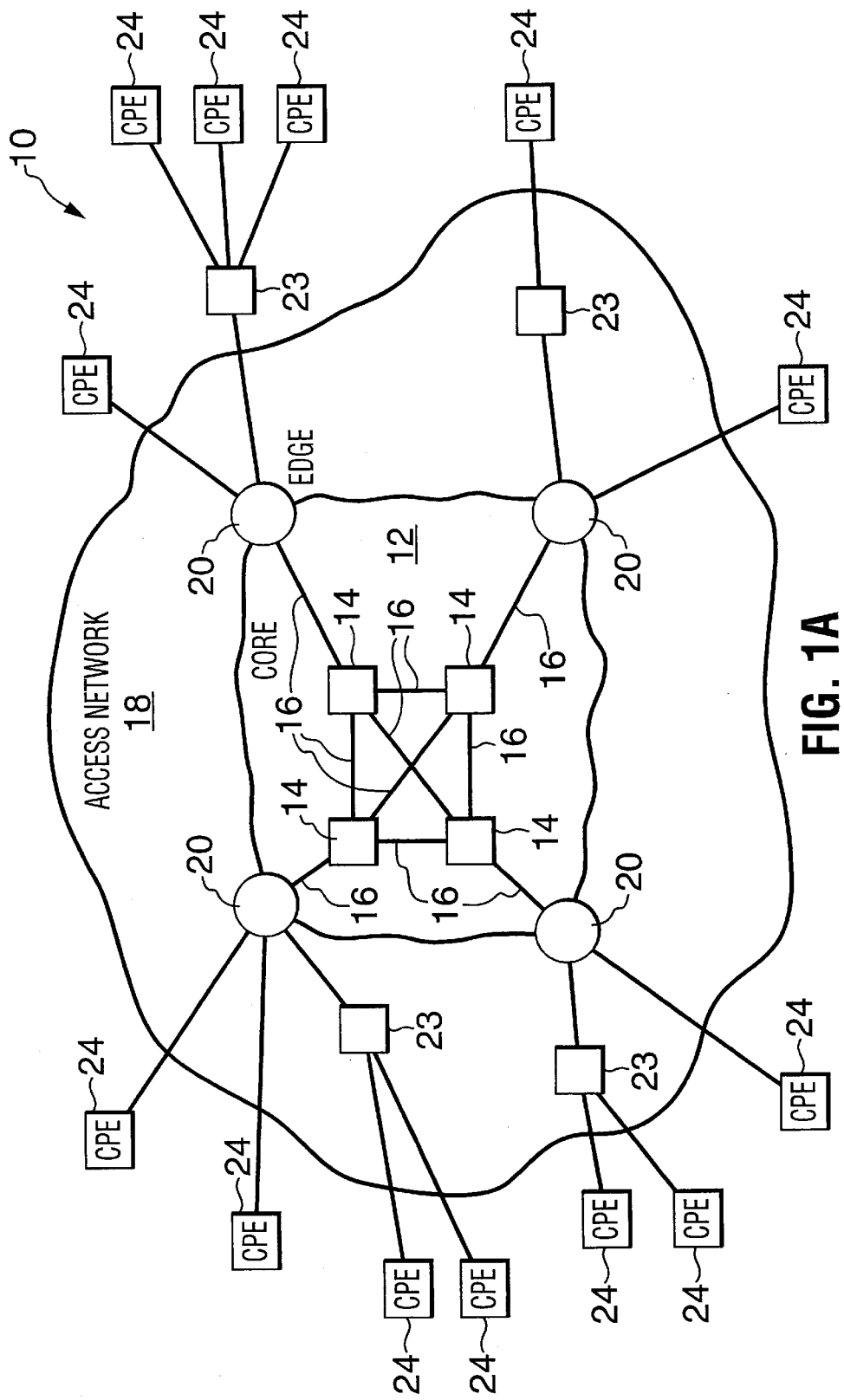
FIG. 1A illustrates a general representation of a multiservice network supporting according to the present invention.
Figure 1B:
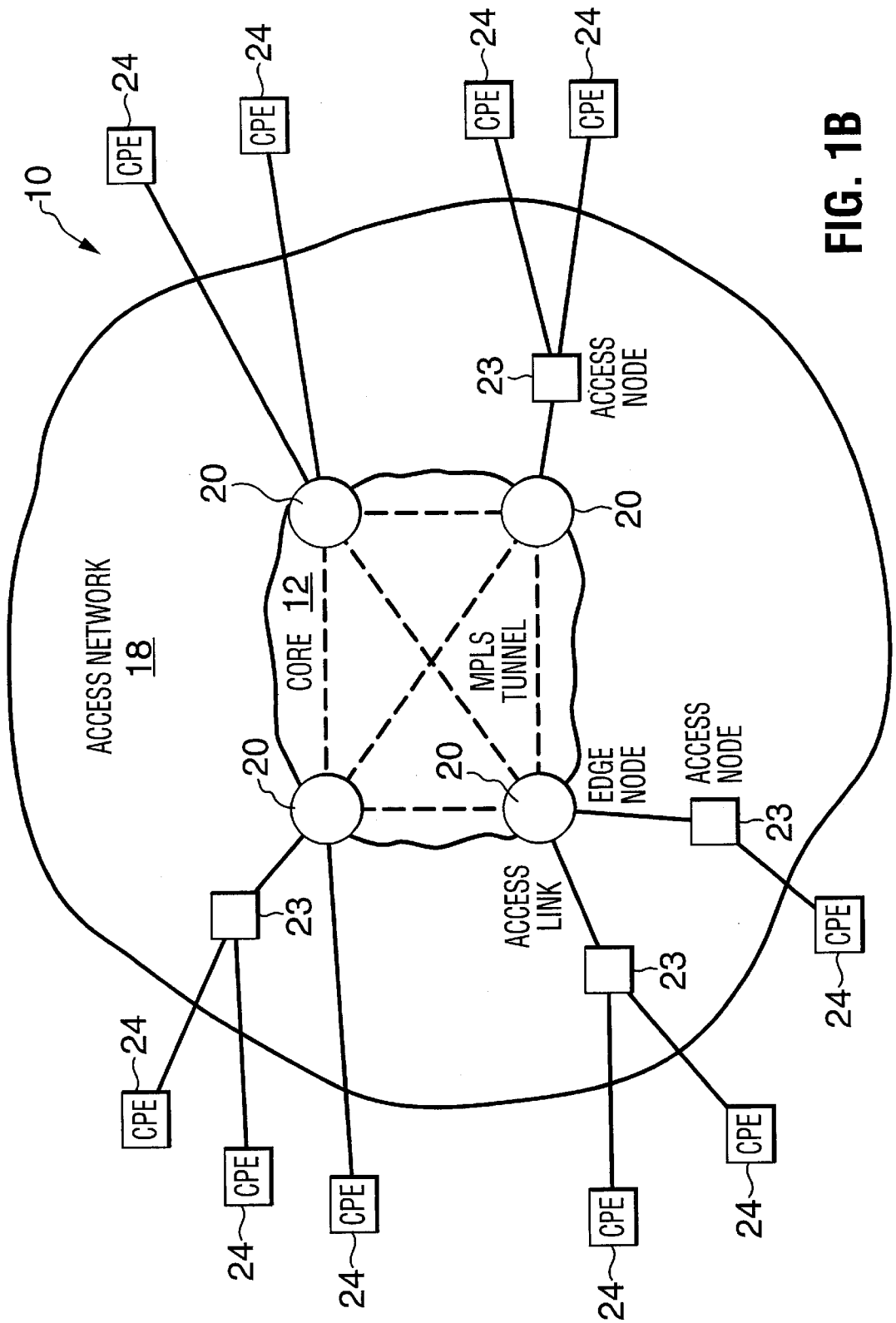
FIG. 1B illustrates a general logical representation of the core network as viewed by the access network of FIG. A supporting MPLS tunnels.

In general, referring to FIG. 1B, hierarchical bandwidth management according to the present invention involves the creation of one or more aggregate tunnels in the core 12 of the network 10 for carrying user traffic between edge nodes 20.

In particular, hierarchical bandwidth management according to the present invention involves, referring to FIGS. 1A and 1B, managing bandwidth in the core network 12 at two levels. The first level is at a transport layer, which manages the links 16 in the core network 12 between edge nodes 20. The second level is at a service layer, which manages bandwidth of the tunnels established at the transport layer.

Typically, the bandwidth in each tunnel is used by numerous services/applications with various bandwidth and QoS requirements. At the second level in the hierarchical management, a number of application pools are established within each tunnel and each service/applications is assigned to one of the application pools. The application pools are then used for admission control of individual connection originated by the CPE nodes 24 and/or by the access nodes 23. The application pools can be flexibly configured to provide full, partial partitioning or hybrid sharing of bandwidth among various services or applications at various QoS levels using the tunnel. The present invention also provides flexible and service-aware overbooking of network resources, and for preemption of lower-priority connections by higher priority ones under failure or resource shortage scenarios.

The detailed description of the present invention will continue using the Multiprotocol Label Switching (MPLS) model to provide a consistency in terminology and logic. However, the hierarchical management model of the present invention applies equally to other network models as will be readily apparent to those skilled in the art.

By way of background, one use of MPLS is to create topology-driven paths through a network. These paths allow IP traffic (for example) between different nodes in the network to be routed only at the ingress edge of the MPLS domain. After the first node, the data is then forwarded based purely on the attached label, rather than a routing analysis performed on the IP header. If this label is encoded into the header of various Layer 2 forwarding technologies such as ATM and frame relay, these switches then can participate in the network packet forwarding using the MPLS label.

With topology-driven MPLS, Label Switch Paths (LSPs) are created between pairs of nodes in the network. Hence, the LSPs are established according to the network node topology. The LSPs are initiated based on the routing information within the nodes; therefore, the path to the destination address will be the same for the LSP as for routed packets. If the network consists of switch/router nodes at the edge and a core of MPLS core routers, then MPLS LSPs are established between each pair of switch/routers at the edge through the MPLS core routers. These paths then create direct connections between the edge routers.

Besides creating paths for traffic according to the network topology, MPLS also can be used to create LSPs throughout the network for specific purposes. Each LSP created through the network is established by signaling. This signaling carries information about the required characteristics for the LSP. Since each node in the network must ensure that its part of the connection meets those requirements, it is possible to ensure that the entire LSP also meets the requirements. The requirement characteristics of an LSP typically include: bandwidth (including sustained and peak data rates and maximum burst sizes), delay and delay variation; and path selection.

The path through the network created by MPLS can be controlled using the path selection capability of explicit routing, which is well known to those skilled in the art. With explicit routing the path does not need to follow the normal routing path for that destination. Instead, the path to be taken by the LSP is specified in the signaling.

In summary, MPLS creates paths through a network, and data on these paths is not routed at each nodes, MPLS effectively creates "tunnels" or transport connections through the network. These tunnels have a well-defined entrance, a well-defined exit, and a gate to control what is allowed into the tunnel. Once in the tunnel, there are no branch exits since the data is not routed at intermediate nodes.

Further, the present description refers to L-LSPs and E-LSPs. An L-LSP can only carry a single quality of service. An E-LSP can carry multiple QoS packets. The E-LSP MPLS Exp Bits in each packet header enables the routers to determine the QoS treatment for each individual packet.

Figure 2:
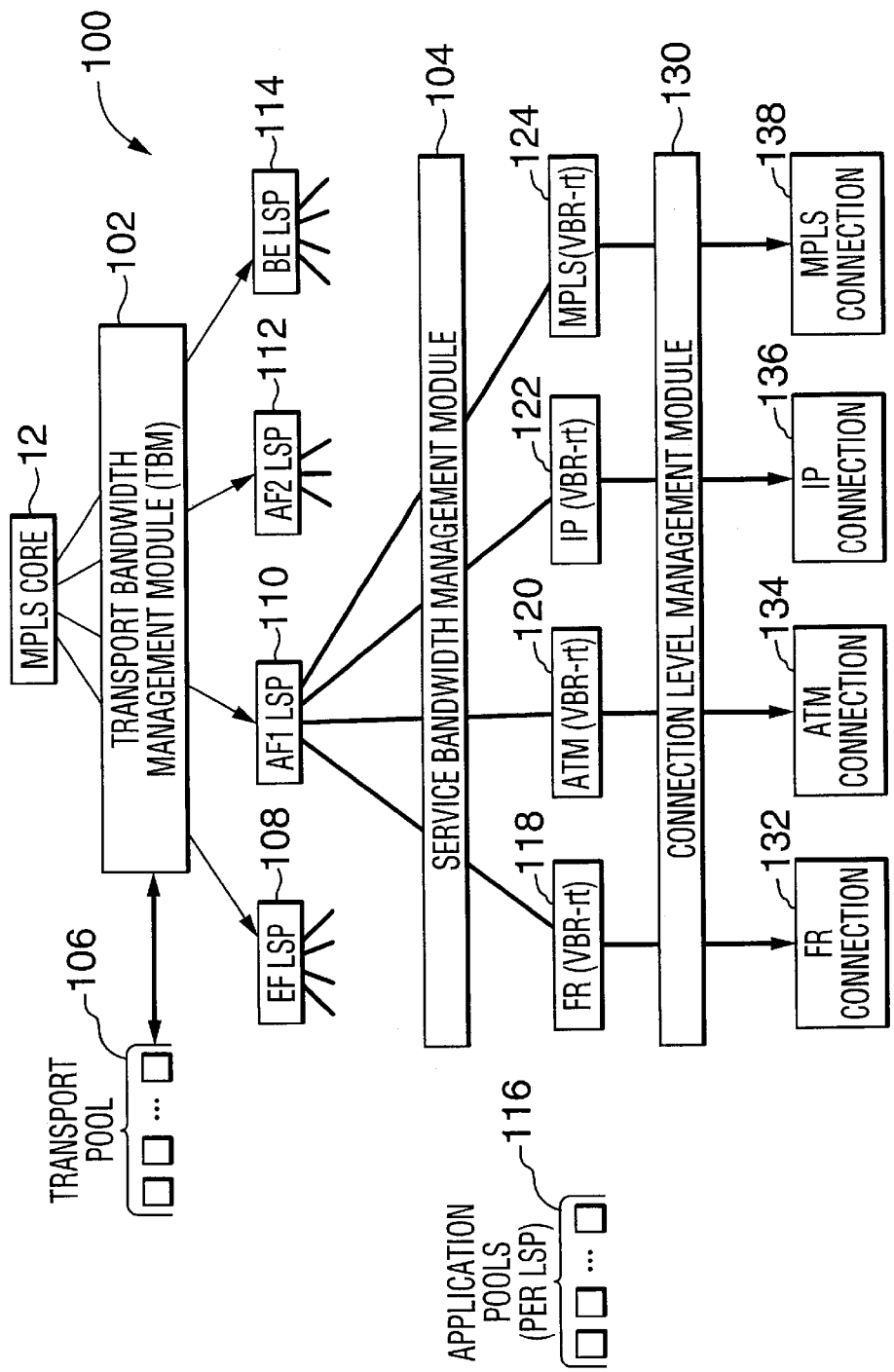
FIG. 2 illustrates a functional block diagram of a hierarchical bandwidth management system according to an embodiment of the present invention.

FIG. 2 illustrates a functional block diagram of a hierarchical bandwidth management system 100 according to an embodiment of the present invention. The system 100 includes a transport bandwidth management (TBM) module 102 and a service bandwidth management (SBM) module 104.

The transport bandwidth management (TBM) nodule 102 establishes at least one transport pool 106 for sharing and partitioning by quality of service (QoS). Examples of QoS in an MPLS environment are: Expedited Forwarding (EF); Assured Forwarding levels 1 and 2 (AF1, AF2), and Best Effort (BE).

The TBM module 102 functions as follows.

(a) core links 16 in the MPLS core 12 (see FIG. 1) are partitioned with a percentile value assigned to each transport pool 106. FIG. 3 illustrates three alternative transport pool 106 configurations: (i) fully shared 106A where only pool is configured at 1.0 Link Rate (L), (ii) partitioned 106B where four pools are configured, or (iii) hybrid 106C with a combination of partitioned and shared where two pools are configured;

(b) map the various QoS levels (EF, AF1, AF2, BE) to an appropriate transport pool established in step (a). FIG. 3 illustrates the mapping between QoS and the transport pools 106 in three different configurations: (i) fully shared 106A (1.0 Link Rate (L)) in which EF, AF1, AF2 and BE share the same pool; (ii) partitioned 106B with each QoS (EF at 0.1L, AF1 at 0.3L, AF2 at 0.4L and BE at 0.2L) mapped to different pools; or (iii) hybrid 106C with a combination of partitioned and shared (EF and AF1 at 0.3L in one pool aid with AF2 and BE at 0.7L combined in another pool): and (c) map cash respective LSP to an appropriate transport pool 106 based on its QoS. Examples of MPLS Label Switch Paths (LSPs) QoS are: Expedited Forwarding (EF) 108;

Assured Forwarding levels 1 and 2 (AF1, AF2) 110, 112; and Best Effort (BE) 114. The MPLS LSPs (108–114) are established using standard MPLS LSP signaling protocol.

Steps (b) and (c) is protocol specific since each MPLS protocol (e.g. CR-LDP {Constraint Based Routed Label Distribution Protocol}, RSVP {Resource Reservation Protocol} and MPLS with Diffserv {differentiated Services} support) has its own set of QoS.

The service bandwidth management (SBM) module 104 establishes at least one application pool 116 for sharing among all applications with up to 16 application pools for partitioning by application and QoS. Examples of application categories in a multiservice network environment are: Asynchronous Transfer Made (ATM); Frame Relay (FR); Multiprotocol Label Switching (MPLS); and Internet Protocol (IP).

The application pools 116 are provisioned as follows:

(a) each of the transport LSPs 108, 110, 112, 114 bandwidth is partitioned, with a percentile value assigned to each of a plurality applications. FIG. 4 illustrates three alternative application pool 116 configurations: (i) fully shared 116A where only one pool is configured; (ii) partitioned 116B where four pools are configured; or (iii) hybrid 116C with a combination of partitioned and shared where two pools are configured; and (b) assign the applications (ATM, FR, MPLS, IP) to one of the application pools 116A–C partitioned in step (a). FIG. 4 illustrates three alternative application pool 116 configurations: (i) fully shared 116A (100%) in which ATM, FR, MPLS and IP share the same pool: (ii) partitioned 116B with each application (ATM at 20% FR at 30%, MPLS at 30% and IP at 20%) mapped to different pools; or (iii) hybrid 116C with a combination of partitioned and shared (ATM and FR at 30% in one pool and with MPLS and IP at 70% combined in another pool).

As described above, one or snore applications can be assigned to the same application pool (e.g. pool 116A and pools 116C). For simplicity in the drawing (FIG. 2), only one mapping is shown: FR at VBR-rt 118; ATM at VBR-rt 120; IP at VBR-rt 122; and MPLS at VBR-rt 124 are mapped to AF1-LSP 110, where CBR is Constant Bit Rate; VBR-rt is Real-Time Variable Bit Rate: VBR-nrt is Non-Real-Time Variable Bit Rate; and UBR is Unspecified Bit Rate.

A connection level management (CLM) module 130 for connection admission control (CAC) is provided to control the admission of the application connection based on its QoS and the corresponding application pool 116: an FR connection 132 with VBR-rt QoS to the FR (VBR-rt) 118; an ATM connection 134 to the ATM (VBR-rt) 120; an IP connection 136 to the IP (VBR-rt) 122 and an MPLS connection 138 to the MPLS (VBR-rt) 124. Similar mappings are established for the EF LSP 108, AF2 LSP 112 and BE LSP 114 transport connections. Details of admission control are discussed hereinbelow in conjunction with FIGS. 8A and 8B.

The SBM module 104 also reports to the access nodes 23 any significant changes in bandwidth as in the case of PNNI (Private Network-to-Network Interface) routing, where a significant change in tunnel bandwidth is flooded throughout the network 10. For example, the SBM module 104 detects the significant change and notifies ATM access switches 23 (as an example), which will inform PNNI networking application of the change. Since a particular LSP can carry more than one application (i.e. ATM shares bandwidth with other applications), PNNI updates are triggered not only by ATM traffic, but by traffic from other applications.

Figure 5:
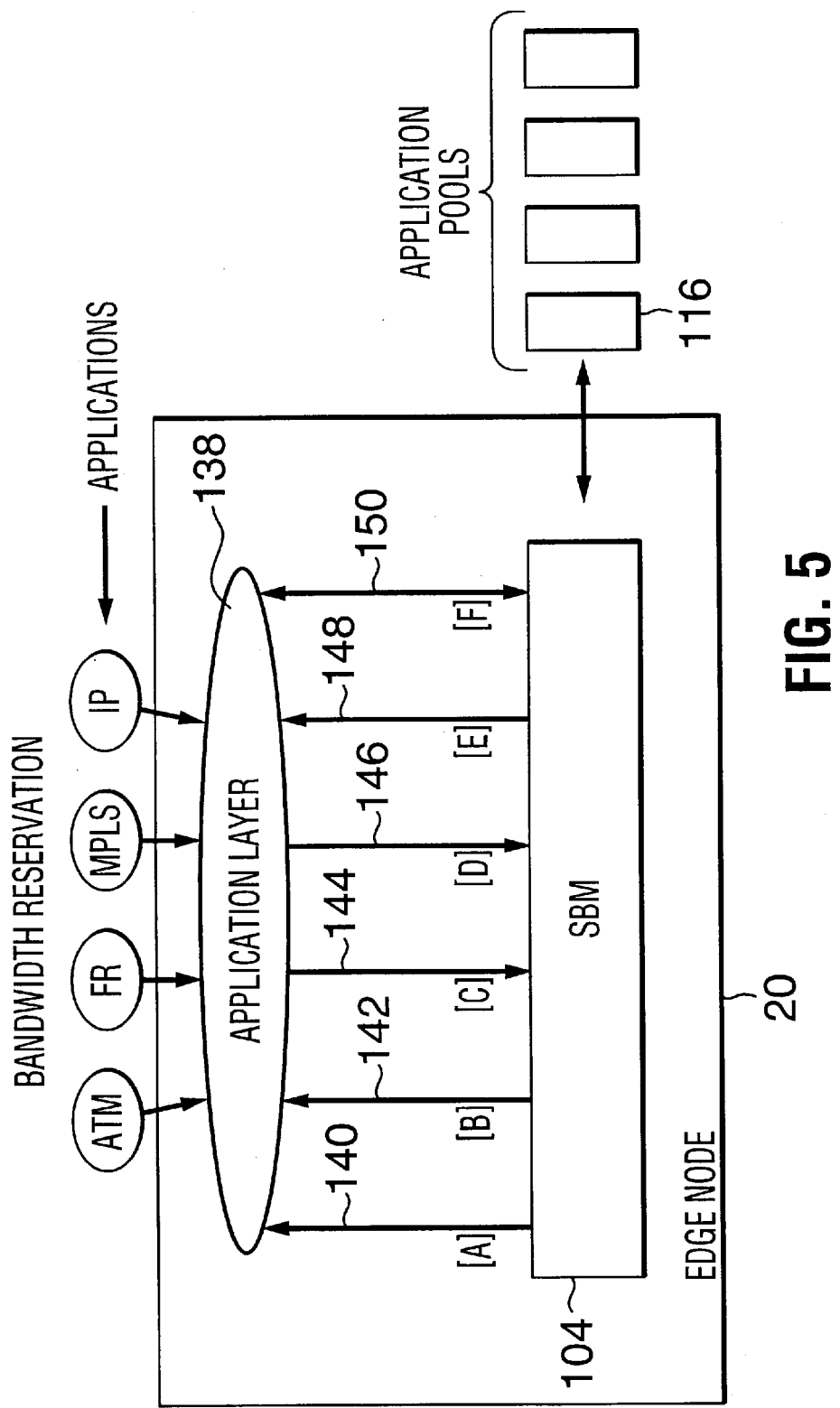
FIG. 5 illustrates the interface between an application layer and the service bandwidth management module of FIG. 4 in the edge node.

FIG. 5 illustrates a functional representation of bandwidth reservation as discussed above. In particular, the following process is used to interface between the SBM 104 and an application layer 138 in one of the edge nodes 20: (A) the SBM 104 advises the application layer 138 of significant bandwidth changes in the application pools 116 with signal at step 140; (B) the SBM 104 advises the application layer 138 of an asynchronous bumping request at step 142; (C) the application layer 138 advises the SBM 104 of a release signal at step 144 when connection is released; (D) the application layer 138 advises the SBM 104 of a request signal at step 146 when application bandwidth is required; (E) the SBM 104 advises the application layer 138 of an accept, reject or accept with bumping signal at step 148 when a decision is made regarding request (D); and (F) the SMB 104 and the application layer 138 communicate a query signal 150 regarding application pool 116 allocations.

The SBM 104 can support up to eight preemption priorities where each application connection is assigned to one these preemption priorities. The application connection with the highest priorities can preempt any of the connections with a lower priority. Therefore, the SBM 104 supports bumping between applications. For example, the SBM 104 can be configured to allow the ATM connection 134 to bump the frame relay connection 132.

Figure 6:
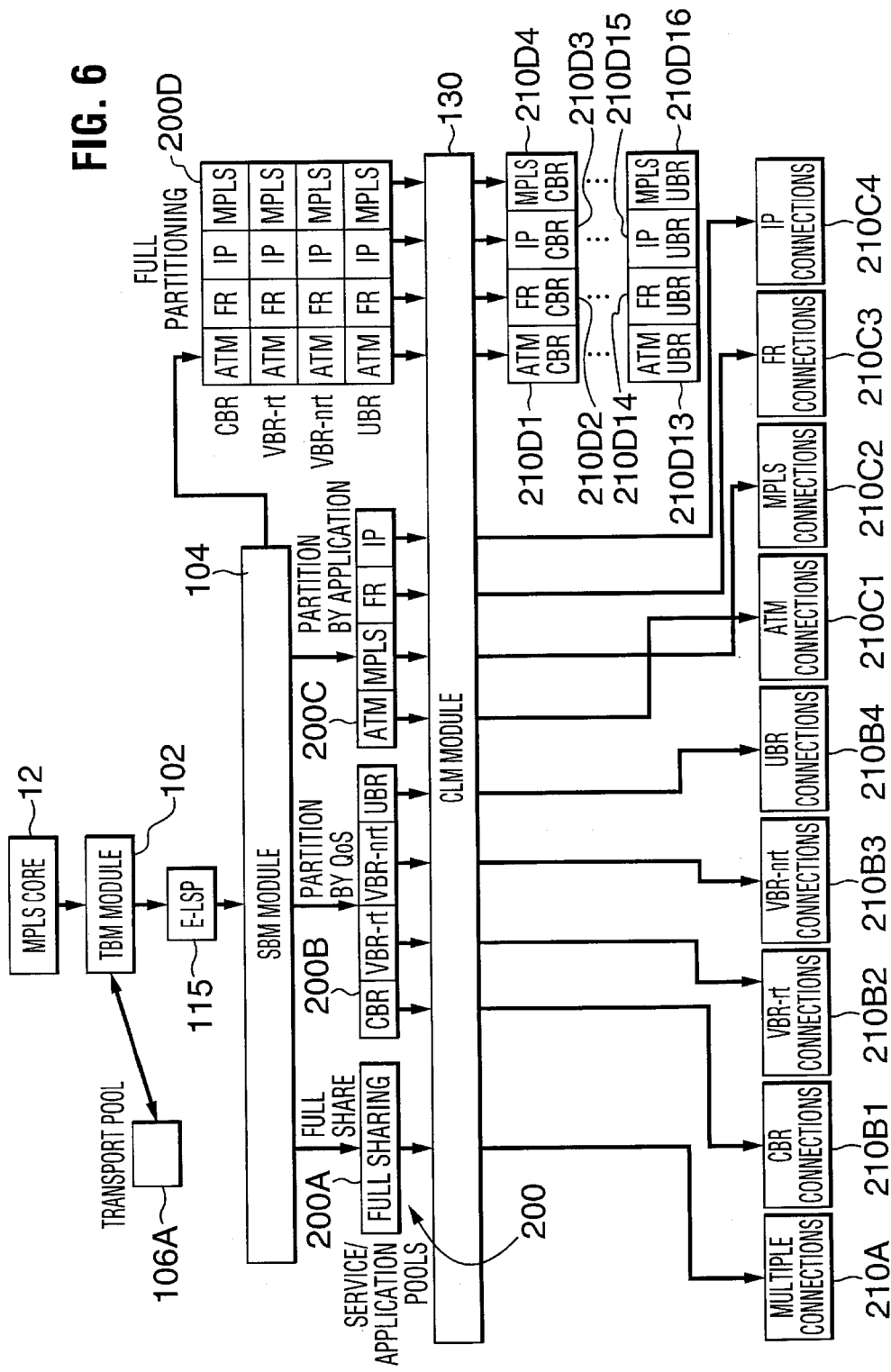
FIG. 6 illustrates a functional block diagram of a hierarchical bandwidth management system according to another embodiment of the present invention.

FIG. 6 illustrates a functional block diagram of a hierarchical bandwidth management system 200 according to another embodiment of the present invention. The system 200 includes the same key modules as system 100 shown in FIG. 2, in particular, the transport bandwidth management (TBM) module 102, the service bandwidth management (SBM) module 104; and the connection level management (CLM) module 130. The fundamental difference between the two systems 100 (FIG. 2) and 200 (FIG. 6) is based on the type of Label Switch Path used. In system 100 an "L"-LSP is used in which multiple pairs of LSPs are established between edge nodes 20. In system 200 and "E"-LSP is used in which a single pair of LSPs is established between edge nodes 20. An L-LSP is characterized by a single QoS treatment for all the packets, whereas an E-LSP is characterized by multiple QoS treatment for its packets based on the setting of experimental bits in an MPLS header.

In system 200, an E-LSP 115 is established and mapped to a single transport pool 106A, which handles all QoS levels. The single tunnel E-LSP 115 bandwidth is managed by the SBM 104 in the same manner as discussed above in conjunction with system 100. FIG. 6 illustrates four alternative application/service pools 200. The application/service pools 200 are classified by QoS or by application type or a combination of the two as discussed below.

The SBM module 104 can enable full sharing where all applications and QoS levels are shared in a single pool 200A. The CLM module 130 maps connection 210A to the pool 200A. The SBM module 104 can enable partitioning by QoS where four QoS levels (CBR, VBR-rt, VBR-nrt, UBR) are partitioned into four pools 200B1–4. The CLM module 130 maps connections 210B1–210B4 to the pool 200B. The SBM module 104 can enable partitioning by application where four applications (ATM, FR, MPLS, IP) are mapped into four different pools 200C1–4. The CLM module 130 maps connections 210C1–210C4 to the pool 200C.

The SBM module 104 can also enable full partitioning by QoS and application where each QoS (CBR, VBR-rt, VBR-nrt, UBR) are assigned separate applications (ATM, FR, MPLS, IP) to form a QoS vs. application matrix 200D. Each connection of specific QoS and application 210D1–210D16 is mapped through the CLM module 130 to the pools matrix 200D.

In summary, the service bandwidth management (SBM) module 104 involves partitioning tunnel bandwidth by application and/or QoS. For a single QoS tunnel (e.g. MPLS L-LSP-FIG. 2) the available bandwidth in the tunnel is partitioned by application. For a multiple QoS tunnel (e.g. MPLS E-LSP-FIG. 6) the available bandwidth in the tunnel is partitioned by application and/or QoS. The SBM module 104 is managed at one of the ingress edge nodes 20 for managing bandwidth between various applications and QoS sharing the same LSP.

Figure 7A:
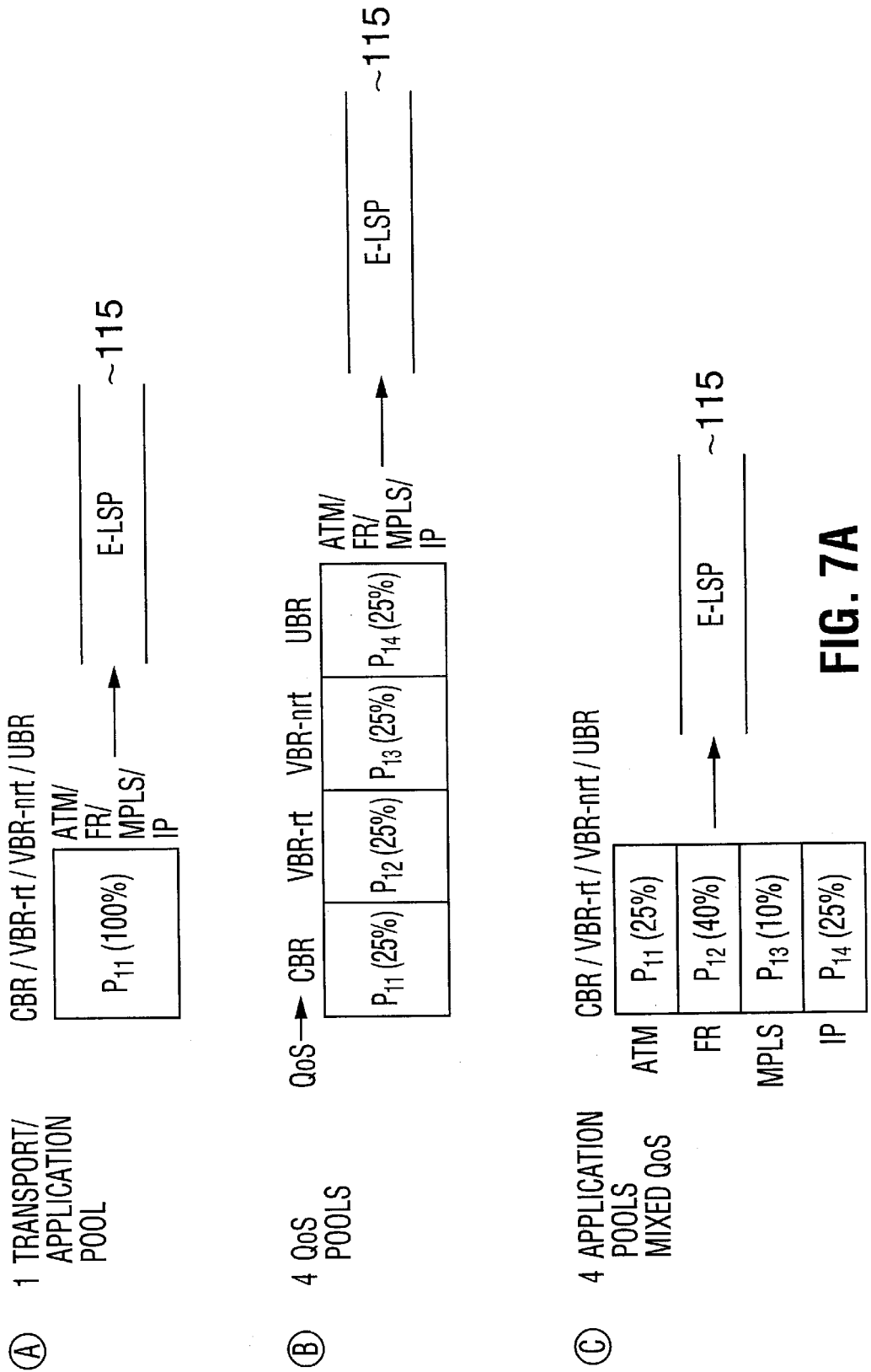
FIGS. 7A and 7B illustrates several examples of hierarchical bandwidth management using the Multiprotocol Label Switching (MPLS) model with E-LSP.
Figure 7B:
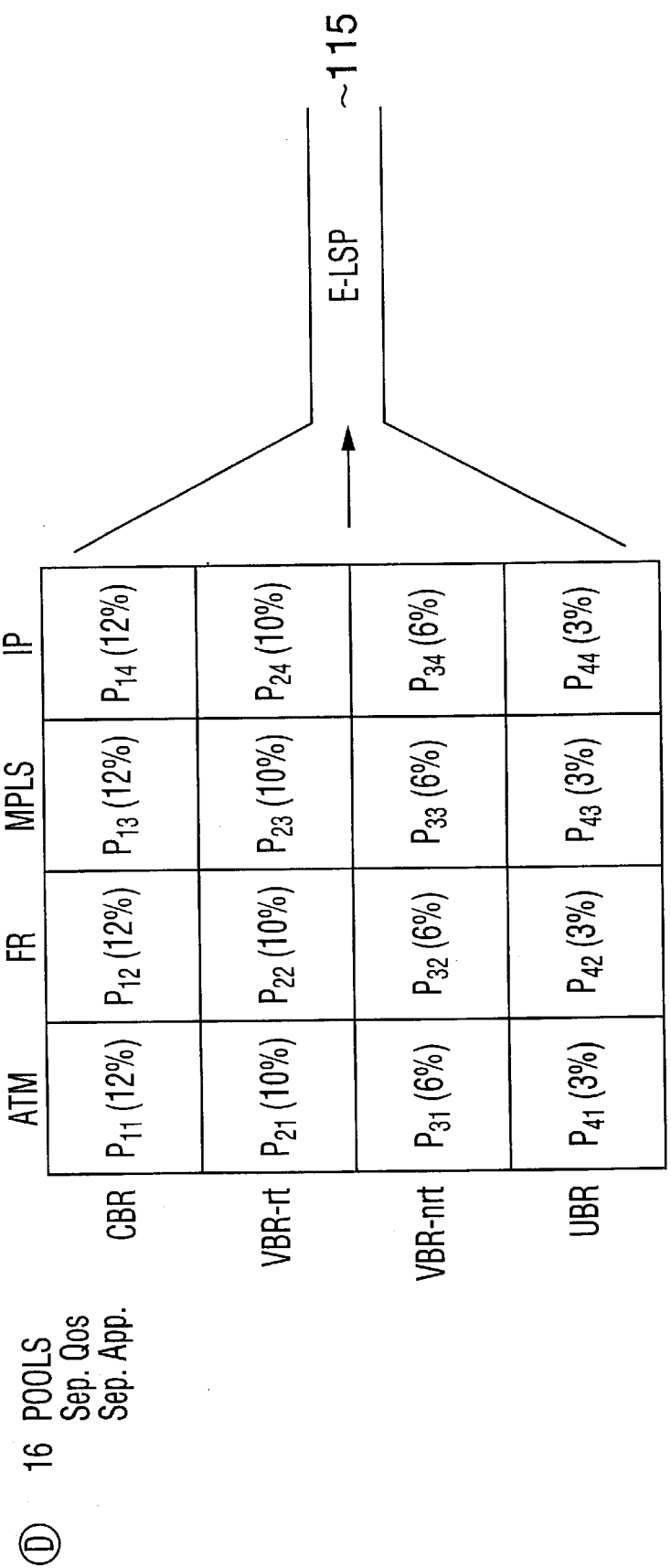

FIGS. 7A and 7B illustrates several examples of hierarchical bandwidth management using the Multiprotocol Label Switching (MPLS) model with and E-LSP tunnel. Example A illustrates one transport/application pool (P11= 100%) for all QoS levels (CBR, VBR-rt, VBR-nrt, UBR) and all applications (ATM, FR, MPLS, IP) for the single E-LSP tunnel 115. Example B illustrates four QoS pools with mixed applications for the E-LSP tunnel 115. In particular, P11(CBR, ATM/FR/MPLS/IP) is assigned 25% of bandwidth for the E-LSP tunnel 115 and P12(VBR-rt, ATM/FR/MPLS/IP) is assigned 25% of bandwidth for tunnel the E-LSP tunnel 115. Similar pools are established for the VBR-rt and UBR as shown in Example B of FIG. 7A.

Example C illustrates four applications pools with mixed QoS levels for the E-LSP tunnel 115. In particular, P11 (ATM, CBR/VBR-rt/VBR-nrt/UBR)is assigned 25% of bandwidth for the E-LSP tunnel 115 and P12(FR, CBR/VBR-rt/VBR-nrt/UBR) is assigned 40% of bandwidth. Similar pools P13 at 10% and P14 at 25% are established as shown in Example C. Example D (FIG. 7B) illustrates 16 pools separated by QoS and application for the E-LSP tunnel 115. For example, P22(VBR-rt, MPLS) is assigned 10% of bandwidth on the E-LSP tunnel 115.

FIGS. 8A and 8B illustrate functional diagrams of the distributed connection admission control and overbooking features of hierarchical bandwidth management of the present invention. A task of the CLM module 130 is to determine whether a requested bandwidth and QoS for a new connection can be supported. Two levels of admission control are used. A transport level CAC 300 (FIG. 8A), which controls the admission of transport LSPs (108–114, 115) and an application level CAC 350 (FIG. 8B) to control the admission of applications over a specific LSP 108–114, 115.

From the bandwidth perspective the transport CAC 300 involves three steps:

(1) calculate equivalent bandwidth (EBW) from traffic descriptor parameters Equation 1 is an example of an algorithm used to calculate LSP's equivalent bandwidth.

$$EB_W = 2 * CDR * PDR / (CDR + PDR) \qquad \text{Eq. 1}$$

where CDR and PDR are committed data rate and peak data rate respectively (2) normalize the EBW into common units (bytes/sec), apply an appropriate scaling factor and overhead factor as is well known to those skilled in the art. The output to this step is Normalized Effective Bandwidth (NEBW)—i.e. the T-LSP bandwidth is established at edge nodes 20 and core nodes 14.

(3) determine whether the requested bandwidth is available on every link 16 in the selected path (determined by constraint based routing in the core 12) or not and hence the connection is accepted or rejected.

Steps (1) and (2) are implemented in an MPLS transport layer 302 and step (3) is implemented in the TBM 102. The TBM module 102 also receives resource information from the core link resource module 306.

Referring to FIG. 8A, the MPLS transport layer 302 receives transport LSP setup requests and converts protocol specific parameters into effective bandwidth (EBW). The EBW is normalized to generate NEBW and passed to the TBM 102. The TBM 102 checks the availability of bandwidth in the corresponding transport pool, updates it and reports back the decision (accept/reject).

Similar to the transport CAC 300 the application CAC 350 controls the admission of application connection. The application CAC 350 involves similar steps. An example for ATM service follows:

(1) calculate EBW, for example for ATM VBR connection this step uses the known EGH algorithm to convert PCR, SCR, MBS into ECR.

(2) calculate NEBW, for example an ATM connection with EBW of 1 Mbps may require a reservation of 1.3 Mbps due to the MPLS overhead. In particular, NEBW is application connection bandwidth established at the edge nodes 20

(3) check bandwidth availability.

Steps (1) and (2) are implemented in the application layer 138 and step (3) is implemented in the SBM module 104 of the edge node 20. The SBM module 104 receives tunnel resource information from a tunnel resource module 307.

Referring to FIG. 8B, the application layer 138 receive connection setup requests and convert application specific traffic descriptors into EBW and then convert to NEBW. The NEBW is passed to the SBM module 104 which checks for availability of bandwidth in the corresponding application pool, updates it and report back to the core nodes 14 with the result (accept/reject).

Figure 9:
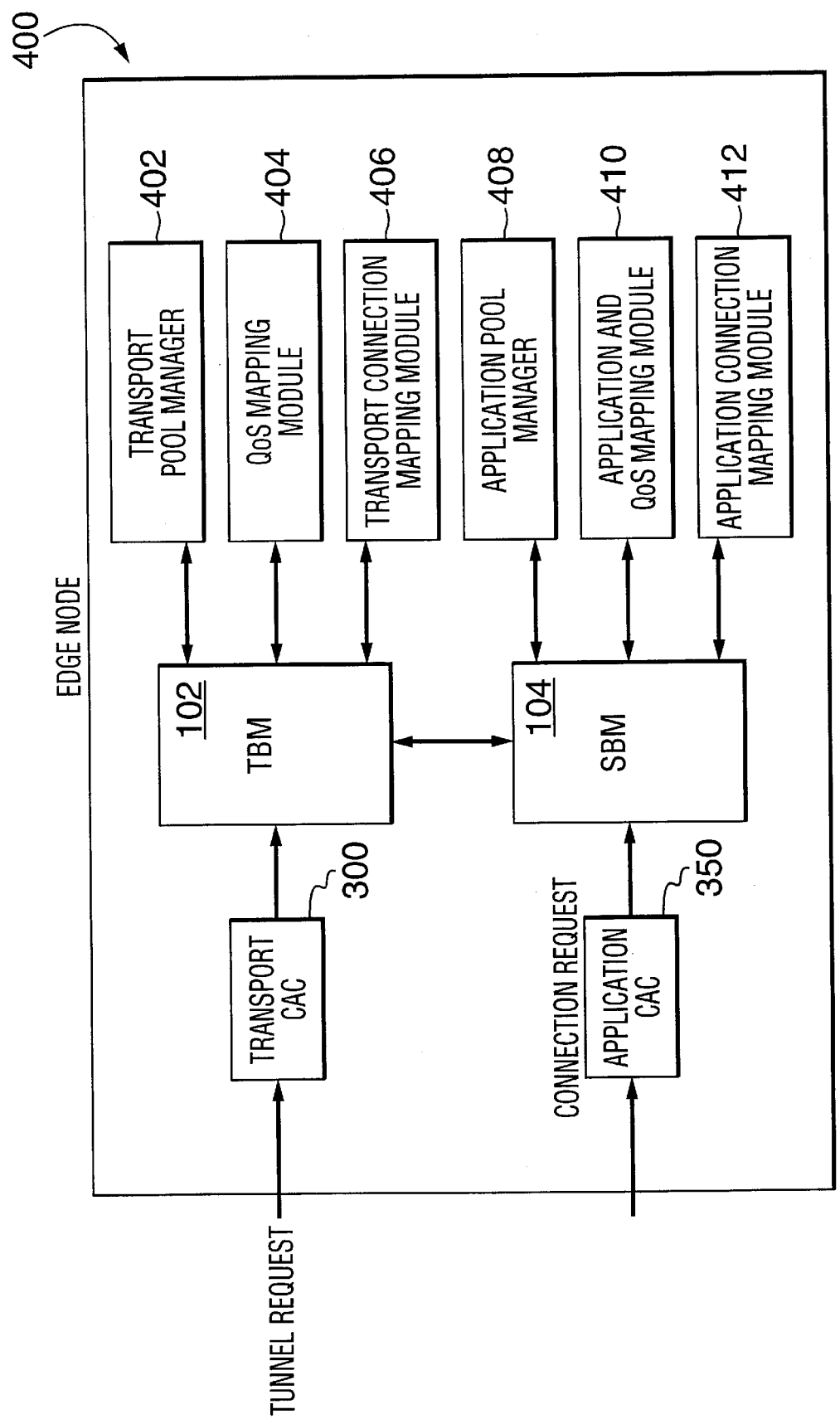
FIG. 9 illustrates a block diagram of a hierarchical bandwidth management apparatus exemplified in a switching environment.

FIG. 9 illustrates a block diagram of tie components of a hierarchical bandwidth management apparatus 400 implemented in a switch (e.g. the edge node 20).

The apparatus 400 is implemented in the edge node 20 and is used for hierarchical bandwidth management in a multiservice network supporting a number of QoS (e.g. EF, AF1, AF2, BE) and a number of applications (e.g. ATM. MPLS, IP, FR). The apparatus 400 includes:(a) the transport bandwidth management (TBM) module 102 for establishing a transport connection (e.g. an LSP) between the edge nodes 20 in the network 10; and (b) the service bandwidth management (SBM) module 104 for managing bandwidth of the transport connection among the QoS and the applications.

The TBM module 102 includes a transport pool manager 402 for establishing and managing the transport pool 106; a QoS mapping module 404 for assigning the QoS to each transport pool and a transport pool connection module 406 for assigning the transport connection to the appropriate transport pool.

The SBM module 104 includes an application pool manager nodule 408 for establishing and managing application pools 116 for the QoS and the applications, an application and QoS mapping module 410 for assigning application and QoS to each application pool and an application connection mapping module 412 for assigning application connections to the appropriate application pool. The module 408 creates shared pools 200A; partitioned pools 200B (by QoS) or 200C (by application) or fully partitioned pools 200D by QoS and application.

The apparatus 400 includes the transport CAC nodule 300 to control admission of the transport connection and the application CAC module 350 to control admission of the applications over the transport connection as discussed above based on tunnel requests.

Although the present description of the invention used MPLS as the working example hierarchical bandwidth management of the present invention is applicable to any network that can benefit from hierarchical structure for scalability. Optical networks are one example where large optical tunnels can be established between edge nodes and bandwidth management takes place at the edge (i.e. the SBM module functionality). Another example is Virtual Private Networks (VPNs) where multiple customers share the same aggregate backbone pipes.

In summary, hierarchical bandwidth management of the present invention provides the following advantages:

(a) increased network scalability without sacrificing bandwidth management efficiency and flexibility;

(b) ability to share and/or partition bandwidth by application and quality of service; and (c) ability of customer-controlled trade-off of bandwidth guarantee (per application/QoS) and network efficiency (i.e. low fragmentation).

What is claimed is:

1. A method of hierarchical bandwidth management in a multiservice network supporting a plurality of quality of service levels and a plurality of applications, said multiservice network having a core, a plurality of access nodes and a plurality of edge nodes having connectivity with each other through the core with core links, said method comprising the steps of:

(a) establishing a plurality of transport connection tunnels as label switched paths between pairs of the edge nodes in the network comprising:

establishing at least one transport pool shared among the plurality of quality of service levels;

assigning the plurality of quality of service levels to the least one transport pool; and assigning at least one transport pool to the plurality of transport connection tunnels; and (b) managing bandwidth of the transport connection tunnels among the plurality of quality of service levels and the plurality of applications.

2. The method of claim 1, wherein each of the core links is partitioned into multiple transport pools with a single quality of service level selected from the plurality of quality of service levels being assigned to each pool.

3. The method of claim 1, wherein each of the core links is partitioned into multiple transport pools with groups quality of service levels selected from the plurality of quality of service levels.

4. The method of claim 1, wherein the plurality of transport connections are label switched paths and where the plurality of quality of service levels are selected from the group consisting of EF, AF1, AF2 and BE.

5. The method of claim 1, wherein step (b) includes the steps of:
 (b1) establishing at least one application pool; and
 (b2) assigning the plurality of applications to the least one application pool.

6. The method of claim 5, wherein bandwidth of the transport connection tunnels is assigned to one of the at least one application pool for sharing among the plurality of applications.

7. The method of claim 5, wherein bandwidth of the transport connection tunnels is assigned to multiple of the at least one application pool for each the plurality of applications.

8. The method of claim 5, wherein bandwidth of the transport connection tunnels is assigned to multiple of the at least one application pool for sharing among groups of the plurality of applications.

9. The method of claims 6, wherein the plurality of transport connections are label switched paths and where the plurality of applications are selected from the group consisting of ATM, FR, MPLS, and IP.

10. The method of claim 5, further comprising:
 (c) advising the access nodes of the network of changes to the least one application pool; and
 (d) if bandwidth is available in the core, revising the assignment of the plurality of applications to the at least one application pool established at step (b2).

11. A method of hierarchical bandwidth management in a multiservice network supporting a plurality of quality of service levels and a plurality of applications, said multiservice network having a core, a plurality of access nodes and a plurality of edge nodes having connectivity with each other through the core, said method comprising the steps of:
 (a) establishing a transport connection tunnel as a label switched path between pairs of the edge nodes in the network comprising:
  (a1) establishing a transport pool;
  (a2) assigning the plurality of quality of service levels to the transport pool; and
  (a3) assigning the transport connection tunnel to the transport pool; and
 (b) managing bandwidth of the transport connection tunnel among the plurality of quality of service levels and the plurality of applications.

12. The method of claims 11, wherein the transport connection is a label switched path and where the plurality of quality of service levels are selected from the group consisting of EF, AF1, AF2 and BE.

13. The method of claim 11, wherein step (b) includes the step of:
 (b1) establishing a shared application pool for the plurality of quality of service levels and the plurality of applications.

14. The method of claim 11, wherein step (b) includes the steps of:
 (b1) establishing multiple application pools partitioned by quality of service; and
 (b2) assigning a percentile value of total transport connection tunnel bandwidth to each quality of service.

15. The method of claim 11, wherein step (b) includes the steps of:
 (b1) establishing multiple application pools partitioned by application; and
 (b2) assigning a percentile value of total transport connection tunnel bandwidth to each application.

16. The method of claim 11, wherein step (b) includes the steps of:
 (b1) establishing multiple application pools partitioned by quality of service level and by application; and
 (b2) assigning a percentile value of total transport connection tunnel bandwidth to each quality of service level and application.

17. An apparatus for hierarchical bandwidth management in a multiservice network supporting a plurality of quality of service levels and a plurality of applications, said multiservice network having a core, a plurality of access nodes and a plurality of edge nodes having connectivity with each other through the core, said apparatus comprising:
 (a) a transport bandwidth management (TBM) module for establishing a transport connection tunnel as a label switched path between pairs of the edge nodes in the network; the TBM module comprising:
  a module for establishing and managing a transport pool;
  a module for assigning the plurality of quality of service levels to the transport pool; and
  a module for assigning the transport connection tunnel to the transport pool; and
 (b) a service bandwidth management (SBM) module communicatively coupled to the TBM module for establishing application connections for managing bandwidth of the transport connection tunnel among the plurality of quality of service levels and the plurality of applications.

18. The apparatus of claim 17, wherein the SBM module includes:
 a module for establishing and managing a plurality of application pools;
 a module for assigning the plurality of applications at the plurality of quality of service levels to each of the plurality of application pools; and
 a module for assigning the application connections to the plurality of application pools.

19. The apparatus of claim 17, wherein the SBM module includes:
 a module for establishing multiple application pools partitioned by quality of service; and
 a module for assigning a percentile value of total transport connection tunnel bandwidth to each quality of service.

20. The apparatus of claim 17, wherein the SBM module includes:
 a module for establishing multiple application pools partitioned by application; and
 a module for assigning a percentile value of total transport connection tunnel bandwidth to each application.

21. The apparatus of claim 17, wherein the SBM module includes:

a module for establishing multiple application pools partitioned by quality of service level and by application; and a module for assigning a percentile value of total transport connection tunnel bandwidth to each quality of service level and application.

22. The apparatus of claim 21, further comprising a transport connection admission control module to control admission of the transport connection and an application connection admission control module to control admission of the plurality of applications over the transport connection.

23. The apparatus of claim 17, wherein the apparatus resides in the plurality of edge nodes.

24. An edge node for hierarchical bandwidth management in a multiservice network supporting a plurality of quality of service levels and a plurality of applications, said multiservice network having a core and a plurality of access nodes where a plurality of the edge nodes having connectivity with each other through the core, the edge node including the apparatus of claim 1.

25. A computer program product for hierarchical bandwidth management in a multiservice network supporting a plurality of service categories and a plurality of applications, said multiservice network having a core, a plurality of access nodes and a plurality of edge nodes having connectivity with each other through the core, said computer program product comprising:
 (a) a computer readable medium;
 (b) a transport bandwidth management (TBM) module for establishing a transport connection tunnel as a label switched path between pairs of the edge nodes in the network; the TBM module comprising:
  a module for establishing and managing a transport pool;
  a module for assigning the plurality of quality of service levels to the transport pool; and
  a module for assigning the transport connection tunnel to the transport pool; and
 (c) a service bandwidth management (SBM) module communicatively coupled to the TBM module for managing bandwidth of the transport connection tunnel among the plurality of quality of service levels and the plurality of applications.

26. The computer program product of claim 25, wherein the SBM module includes:
 a module for establishing and managing a plurality of application pools;
 a module for assigning the plurality of applications at the plurality of quality of service levels to each of the plurality of application pools; and
 a module for assigning the application connection to the plurality of application pools.

27. The computer program product of claim 25, wherein the SBM module includes:
 a module for establishing multiple application pools partitioned by quality of service; and
 a module for assigning a percentile value of total transport connection tunnel bandwidth to each quality of service.

28. The computer program product of claim 25, wherein the SBM module includes:
 a module for establishing multiple application pools partitioned by application; and
 module for assigning a percentile value of total transport connection tunnel bandwidth to each application.

29. The computer program product of claim 25, wherein the SBM module includes:

a module for establishing multiple application pools partitioned by quality of service level and by application; and a module for assigning a percentile value of total transport connection tunnel bandwidth to each quality of service level and application.

30. The computer program product of claim 29, further comprising a transport connection admission control module to control admission of the transport connection and an application connection admission control module to control admission of the plurality of applications over the transport connection.

31. A method of hierarchical bandwidth management in a multiservice network supporting a plurality of quality of service levels and a plurality of applications, said multiservice network having a core, a plurality of access nodes and a plurality of edge nodes for establishing user connections, said edge nodes having connectivity with each other through the core, said method comprising the steps of:
 (a) establishing a plurality of transport connection tunnels as label switched paths between pairs of the edge nodes in the network at a transport layer comprising:
  establishing at least one transport pool shared among the plurality of quality of service levels;
  assigning the plurality of quality of service levels to the least one transport pool; and
  assigning at least one transport pool to the plurality of transport connection tunnels;
 (b) managing bandwidth of the transport connection tunnels at an application layer;
 (c) controlling admission of the plurality of transport connection tunnels at the transport layer; and
 (d) controlling admission of the user connections belonging to the plurality of applications at the plurality of quality of service levels.

32. The method of claim 31, wherein step (b) includes the step of allocating bandwidth of the transport connection tunnels among the plurality applications.

33. The method of claim 32, wherein the plurality of applications are selected from the group consisting of ATM, MPLS, FR and IP.

34. The method of claim 31, wherein step (b) includes the step of allocating bandwidth of the transport connection tunnels among the plurality of quality of service levels.

35. The method of claim 34, wherein the plurality of quality of service levels are selected from the group consisting of IP based parameters: EF, AF1, AF2 and BE at the transport layer.

36. The method of claim 34, wherein the plurality of quality of service levels are selected from the group consisting of ATM based parameters: CBR, VBR-rt, VBR-nrt and UBR at the application layer.

37. The method of claim 34, wherein step (b) includes the step of allocating bandwidth of the transport connection tunnels among the plurality of applications at the plurality of quality of service levels.

38. The method of claim 34, further comprising the step of defining priority for each of the plurality of applications at each of the quality of service levels.

39. The method of claim 38, further comprising the step of bumping a selected one of said plurality of applications from a given priority.

40. The method of claim 34, steps (c) and (d) including converting protocol dependent application parameters to generic bandwidth requirements.

* * * * *

UNITED STATES PATENT AND TRADEMARK OFFICE
CERTIFICATE OF CORRECTION

PATENT NO. : 6,795,445 B1
DATED : September 21, 2004
INVENTOR(S) : Rabie et al.

It is certified that error appears in the above-identified patent and that said Letters Patent is hereby corrected as shown below:

<u>Title page,</u>
Item [75], Inventors, the first inventor's surname is twice incorrectly listed as "Kabie" should read -- Rabie --.

<u>Column 13,</u>
Line 20, "apparatus of claim 1." should read -- apparatus of claim 17. --
Line 64, "module for assigning ..." should read -- a module for assigning ... --

Signed and Sealed this

Eleventh Day of January, 2005

JON W. DUDAS
*Director of the United States Patent and Trademark Office*